(12) United States Patent
Chen et al.

(10) Patent No.: US 12,437,397 B2
(45) Date of Patent: Oct. 7, 2025

(54) IMAGING SYSTEM AND METHOD FOR RADIOGRAPHIC INSPECTION

(71) Applicants: TSINGHUA UNIVERSITY, Beijing (CN); Nuctech Company Limited, Beijing (CN)

(72) Inventors: Zhiqiang Chen, Beijing (CN); Li Zhang, Beijing (CN); Xin Jin, Beijing (CN); Hongkai Yang, Beijing (CN); Xiaofei Xu, Beijing (CN); Zhenhua Zhao, Beijing (CN); Siyuan Zhang, Beijing (CN); Changyu Chen, Beijing (CN)

(73) Assignees: TSINGHUA UNIVERSITY, Beijing (CN); Nuctech Company Limited, Beijing (CN)

( * ) Notice: Subject to any disclaimer, the term of this patent is extended or adjusted under 35 U.S.C. 154(b) by 351 days.

(21) Appl. No.: 17/967,039

(22) Filed: Oct. 17, 2022

(65) Prior Publication Data
US 2023/0124325 A1    Apr. 20, 2023

(30) Foreign Application Priority Data
Oct. 15, 2021    (CN) .......................... 202111204463.6

(51) Int. Cl.
*G06T 7/00* (2017.01)
*A61B 6/00* (2006.01)
(Continued)

(52) U.S. Cl.
CPC ............ *G06T 7/0012* (2013.01); *A61B 6/027* (2013.01); *A61B 6/032* (2013.01); *A61B 6/54* (2013.01);
(Continued)

(58) Field of Classification Search
CPC ......... G06T 7/0012; G06T 2207/10081; A61B 6/027; A61B 6/032; A61B 6/54;
(Continued)

(56) References Cited

U.S. PATENT DOCUMENTS

| 4,442,489 A | 4/1984 | Wagner |
| 6,385,278 B1 | 5/2002 | Hsieh |

(Continued)

FOREIGN PATENT DOCUMENTS

| CN | 1496712 A | 5/2004 |
| CN | 1758877 A | 4/2006 |

(Continued)

OTHER PUBLICATIONS

CNIPA; Second Office Action for Chinese Patent Application No. 202111204463.6 dated Jun. 1, 2024, 25 pages.
(Continued)

*Primary Examiner* — Siamak Harandi
(74) *Attorney, Agent, or Firm* — K&L Gates LLP

(57) ABSTRACT

The present disclosure relates to an imaging system and method for radiographic inspection. The imaging system for radiographic inspection includes an inspection area including an imaging area; a first ray source assembly, all the first targets of which are arranged in a first ray source plane; a first detector assembly, the plurality of first detector units of which are arranged in a detector plane, the detector plane and the first ray source plane are spaced apart from each other in a travelling direction of the object under inspection with a predetermined distance; and a ray source control device, configured such that when the region of interest of the object under inspection is at least partially located in the imaging area, the first ray source assembly emits X-rays simultaneously from at least two first targets to the imaging area at the same time.

20 Claims, 5 Drawing Sheets

(51) Int. Cl.
  *A61B 6/02* (2006.01)
  *A61B 6/03* (2006.01)
  *G06V 10/25* (2022.01)

(52) U.S. Cl.
  CPC .... *G06V 10/25* (2022.01); *G06T 2207/10081* (2013.01)

(58) Field of Classification Search
  CPC ... A61B 6/5282; A61B 6/4007; A61B 6/4275; A61B 6/4014; G06V 10/25; G06V 2201/03; G06V 2201/12; G01N 23/046
  See application file for complete search history.

(56) References Cited

U.S. PATENT DOCUMENTS

| | | | |
|---|---|---|---|
| 6,661,866 | B1 | 12/2003 | Limkeman et al. |
| 2003/0043958 | A1 | 3/2003 | Mihara et al. |
| 2013/0163721 | A1* | 6/2013 | Koh .................. A61B 6/06 378/62 |
| 2015/0078511 | A1 | 3/2015 | Tang et al. |
| 2015/0185355 | A1* | 7/2015 | Zhang .................. G01V 5/226 378/20 |
| 2016/0003965 | A1 | 1/2016 | Chen et al. |
| 2016/0022237 | A1 | 1/2016 | Hiraoka et al. |
| 2016/0209514 | A1* | 7/2016 | Moskal .................. A61B 6/037 |
| 2020/0170097 | A1 | 5/2020 | Tan et al. |
| 2021/0145373 | A1 | 5/2021 | Biju et al. |

FOREIGN PATENT DOCUMENTS

| | | |
|---|---|---|
| CN | 101352353 A | 1/2009 |
| CN | 101472524 A | 7/2009 |
| CN | 101561405 A | 10/2009 |
| CN | 102764137 A | 11/2012 |
| CN | 104101910 A | 10/2014 |
| CN | 104483711 A | 4/2015 |
| CN | 104749648 A | 7/2015 |
| CN | 104897703 A | 9/2015 |
| CN | 105374654 A | 3/2016 |
| CN | 106783484 A | 5/2017 |
| CN | 211381407 U | 9/2020 |
| CN | 111759335 A | 10/2020 |
| CN | 115105110 A | 9/2022 |
| DE | 102019107348 A1 | 9/2019 |
| JP | 2004081870 A | 3/2004 |

OTHER PUBLICATIONS

CNIPA; First Office Action for Chinese Patent Application No. 202111204463.6 dated Dec. 27, 2023, 19 pages.

ISA/CN; International Search Report for International Patent Application No. PCT/CN2022/124449 dated Nov. 25, 2022, 4 pages, translation provided.

EPO; Extended European Search Report for European Patent Application No. 22880277.3 dated Dec. 6, 2024, 7 pages.

Notice of Allowance dated Sep. 5, 2025 issued by National Intellectual Property Administration, PRC (CNIPA) for Chinese Patent Application No. 202411318154.5.

* cited by examiner

IMAGING SYSTEM AND METHOD FOR RADIOGRAPHIC INSPECTION

CROSS REFERENCES TO RELATED APPLICATIONS

The present disclosure claims priority to Chinese Patent Application No. 202111204463.6, filed on Oct. 15, 2021 and titled "IMAGING SYSTEM AND METHOD FOR RADIOGRAPHIC INSPECTION", which is incorporated herein in its entirety.

TECHNICAL FIELD

The present disclosure relates to a technical field of transmission imaging, and specifically relates to an imaging system for radiographic inspection.

BACKGROUND

CT (Computed Tomography) scanning systems are widely used in medical, security and industrial fields. CT scanning generates three-dimensional scanning images with high recognition ability. The existing CT scanning system can include a dynamic spiral CT scanning system and a static CT scanning system according to the movement of the ray source relative to the object under inspection during the scanning process.

SUMMARY

In the existing CT scanning systems, no matter the dynamic spiral CT scanning system or the static CT scanning system, the X-ray emission range of the ray source usually needs to cover the entire object under inspection, that is, the whole object under inspection is scanned and imaged, and these CT scanning systems only have a single target to emit X-rays at the same time. For example, the existing static CT scanning system can use a single distributed ray source and one set of detector system, or can use multiple distributed ray sources and one common set of detector system. However, the one set of detector system can only receive X-rays from one target at the same time. Therefore, the scanning speed of these CT scanning systems is limited by the rotation speed of the slip ring used in the dynamic spiral scanning and the ray emission frequency of the ray source. In the static CT scanning system, the scanning speed is also limited by the ray emission frequency of the ray source. However, in some application scenarios, for example, in imaging of ROI (Region Of Interest) of living bodies, only the ROI of the object under inspection needs to be concerned, and the scanning speed is required to be high. In order to improve the sampling frequency of CT scanning system, generally it is necessary to add additional detector systems, but this will greatly increases the size and cost of the CT scanning system.

Therefore, an improved imaging system and method are needed.

An object of the present disclosure is to provide an imaging system and method capable of scanning only a region of interest. An object of the present disclosure is to provide an imaging system and method capable of improving beam output frequency. An object of the present disclosure is to provide an imaging system and method capable of reducing the size and cost of the equipment. An object of the present disclosure is to provide an imaging system and method that can better solve internal problems of CT. An object of the present disclosure is to provide an imaging system and method capable of reducing the influence of scattered signals.

One aspect of the present disclosure provides an imaging system for radiographic inspection, including: an inspection area, wherein an object under inspection can enter the inspection area, the inspection area includes an imaging area, a region of interest of the object under inspection can enter the imaging area, and the region of interest is a local region of the object under inspection; a first ray source assembly for emitting X-rays, wherein the first ray source assembly includes a plurality of distributed ray sources, each distributed ray source includes a plurality of first targets, and all the first targets of the first ray source assembly are arranged in a first ray source plane; a first detector assembly for receiving X-rays emitted from the first ray source assembly and transmitting through the imaging area of the imaging system, wherein the first detector assembly includes a plurality of first detector units, each first detector unit includes a plurality of first detector crystals, the plurality of first detector units are arranged in a detector plane, and the detector plane and the first ray source plane are spaced apart from each other in a travelling direction of the object under inspection with a predetermined distance; and a ray source control device, configured such that when the region of interest is at least partially located in the imaging area, the first ray source assembly emits X-rays simultaneously from at least two first targets to the imaging area at the same time, wherein among the at least two first targets of the first ray source assembly that simultaneously emit X-rays to the imaging area, a ray emission range of each first target can cover the imaging area, and the first detector crystals corresponding to the ray emission ranges of any two first targets do not coincide with each other.

According to some embodiments of the present disclosure, the imaging system further includes a carrying device for carrying the object under inspection, wherein the imaging system is configured such that the first ray source assembly and the first detector assembly can move in the travelling direction relative to the carrying device, so that the region of interest of the object under inspection can enter the imaging area.

According to some embodiments of the present disclosure, the carrying device is configured to be able to transfer the object under inspection in the travelling direction.

According to some embodiments of the present disclosure, the carrying device is further configured to be able to adjust a position of the region of interest of the object under inspection relative to the imaging area, so that the region of interest of the object under inspection is located within the imaging area.

According to some embodiments of the present disclosure, the imaging area is located between the first ray source plane and an outer edge of the first detector assembly away from the first ray source assembly, wherein the imaging area is defined to be sufficient to accommodate the region of interest.

According to some embodiments of the present disclosure, the imaging area is defined as a cylindrical area with a central axis.

According to some embodiments of the present disclosure, the travelling direction is substantially parallel to the central axis.

According to some embodiments of the present disclosure, the detector plane and the first ray source plane are parallel to each other.

According to some embodiments of the present disclosure, when viewed in the travelling direction, the plurality of distributed ray sources of the first ray source assembly are configured to have a combined extension angle greater than 180 degrees around the imaging area.

According to some embodiments of the present disclosure, the plurality of distributed ray sources of the first ray source assembly are configured to extend completely around the imaging area to form a first ray source ring.

According to some embodiments of the present disclosure, the ray emission range of each first target of the first ray source assembly is selected to be insufficient to cover the inspection area.

According to some embodiments of the present disclosure, each first target of the first ray source assembly is arranged to deflect a first deflection angle towards the first detector unit of the first detector assembly in the travelling direction.

According to some embodiments of the present disclosure, the first deflection angle is between 1 degree and 5 degrees.

According to some embodiments of the present disclosure, when viewed in the travelling direction, the first ray source assembly is configured to be able to rotate within a predetermined range relative to the carrying device to adjust a position of the region of interest of the object under inspection relative to the imaging area, so that the region of interest of the object under inspection is located within the imaging area.

According to some embodiments of the present disclosure, the first ray source assembly further includes at least one second target, and a ray emission range of the second target is selected to be able to cover the inspection area, wherein the ray source control device is further configured such that the second target does not emit X-rays when the first target of the first ray source assembly emits X-rays, and that the first target does not emit X-rays when the second target of the first ray source assembly emits X-rays.

According to some embodiments of the present disclosure, the first ray source assembly includes a plurality of second targets, wherein the ray source control device is configured such that the first ray source assembly can emit X-rays simultaneously from at least two second targets to the inspection area at the same time, wherein among the at least two second targets of the first ray source assembly simultaneously emitting X-rays to the inspection area, the first detector crystals corresponding to the ray emission ranges of any two second targets do not coincide with each other.

According to some embodiments of the present disclosure, when viewed in the travelling direction, the first detector assembly is arranged at a radial inner side of the first ray source assembly.

According to some embodiments of the present disclosure, the first detector assembly is configured to extend completely around the imaging area to form a detector ring.

According to some embodiments of the present disclosure, the first detector unit of the first detector assembly includes a single row of first detector crystals or a plurality of rows of first detector crystals.

According to some embodiments of the present disclosure, the imaging system further includes a second detector assembly for receiving X-rays scattered from the object under inspection, wherein the second detector assembly includes a plurality of second detector units, and each second detector unit includes a plurality of second detector crystals.

According to some embodiments of the present disclosure, the plurality of second detector units of the second detector assembly are arranged correspondingly to the plurality of first detector units of the first detector assembly.

According to some embodiments of the present disclosure, the imaging system further includes a blocking member arranged such that the second detector units do not receive main X-rays emitted from the first ray source assembly.

According to some embodiments of the present disclosure, the second detector crystals of each second detector unit are spaced apart from the first detector crystals of the corresponding first detector unit in the travelling direction, so that the second detector unit does not receive main X-rays emitted from the first ray source assembly.

According to some embodiments of the present disclosure, the number of second detector crystals of each second detector unit is equal to the number of first detector crystals of the corresponding first detector unit; or, the number of second detector crystals of each second detector unit is less than the number of first detector crystals of the corresponding first detector unit.

According to some embodiments of the present disclosure, the imaging system further includes a second ray source assembly for emitting X-rays, wherein the second ray source assembly includes a plurality of distributed ray sources, each distributed ray source includes a plurality of third targets, all the third targets of the second ray source assembly are arranged in a second ray source plane, and the detector plane and the second ray source plane are spaced apart from each other in the travelling direction with a predetermined distance, wherein the first detector assembly is further configured to receive the X-rays emitted from the second ray source assembly and transmitting through the imaging area of the imaging system, wherein the first ray source plane, the detector plane and the second ray source plane are distributed in order in the travelling direction, wherein the ray source control device is configured such that when the region of interest is at least partially located in the imaging area, the second ray source assembly emit X-rays simultaneously from at least two third targets to the imaging area at the same time, and among the at least two third targets of the second ray source assembly that simultaneously emit X-rays to the imaging area, a ray emission range of each third target can cover the imaging area, and the first detector crystals corresponding to the ray emission ranges of any two third targets do not coincide with each other.

According to some embodiments of the present disclosure, the imaging system is configured such that the first ray source assembly, the first detector assembly and the second ray source assembly can move in the travelling direction relative to the carrying device, so that the region of interest of the object under inspection can enter the imaging area.

According to some embodiments of the present disclosure, the imaging area is located between the first ray source plane and the second ray source plane, and wherein the imaging area is defined to be sufficient to accommodate the region of interest.

According to some embodiments of the present disclosure, the imaging area is defined as a cylindrical area with a central axis.

According to some embodiments of the present disclosure, the detector plane, the first ray source plane and the second ray source plane are parallel to each other.

According to some embodiments of the present disclosure, the ray source control device is configured such that at least one first target of the first ray source assembly and at least one third target of the second ray source assembly simultaneously emit X-rays to the imaging area at the same time when the region of interest of the object under inspection is at least partially located in the imaging area, and wherein when at least one first target of the first ray source assembly and at least one third target of the second ray source assembly simultaneously emit X-rays to the imaging area, the detector crystals of the first detector assembly corresponding to the ray emission range of the first target of the first ray source assembly and the detector crystals of the first detector assembly corresponding to the ray emission range of the third target of the second ray source assembly do not coincide with each other.

According to some embodiments of the present disclosure, the imaging system is further configured to construct a three-dimensional scanning image of the region of interest of the object under inspection based on the detection data of the first detector assembly.

Another aspect of the present disclosure provides an imaging method using the imaging system according to the embodiments of the present disclosure, the imaging method includes: (a) loading the object under inspection on the carrying device of the imaging system; and (b) making the first ray source assembly and the first detector assembly of the imaging system move in the travelling direction relative to the carrying device, so that the region of interest of the object under inspection can enter the imaging area, and meanwhile make the first ray source assembly emit X-rays and make the X-rays transmit through the imaging area to be received by the first detector assembly, wherein the step of the first ray source assembly emitting X-rays includes: making the first ray source assembly emit X-rays simultaneously from at least two first targets to the imaging area at the same time, and wherein among the at least two first targets of the first ray source assembly that simultaneously emit X-rays to the imaging area, the ray emission range of each first target can cover the imaging area, and the first detector crystals corresponding to the ray emission ranges of any two first targets do not coincide with each other.

According to some embodiments of the present disclosure, the imaging method further includes adjusting a position of the region of interest of the object under inspection relative to the imaging area by the carrying device after the object under inspection is loaded on the carrying device in the step (a), so that the region of interest of the object under inspection is located within the imaging area.

According to some embodiments of the present disclosure, the imaging method further includes after the object under inspection is loaded on the carrying device in the step (a), rotating the first ray source assembly relative to the carrying device within a predetermined range when viewed in the travelling direction, to adjust a position of the region of interest of the object under inspection relative to the imaging area so that the region of interest of the object under inspection is located within the imaging area.

According to some embodiments of the present disclosure, the step of the first ray source assembly emitting X-rays further includes: emitting X-rays from the second target of the first ray source assembly, and the ray emission range of the second target is selected to be able to cover the inspection area, wherein when the first target of the first ray source assembly emits X-rays, the second target does not emit X-rays, and when the second target of the first ray source assembly emits X-rays, the first target does not emit X-rays.

DETAILED DESCRIPTION

Figure 1:
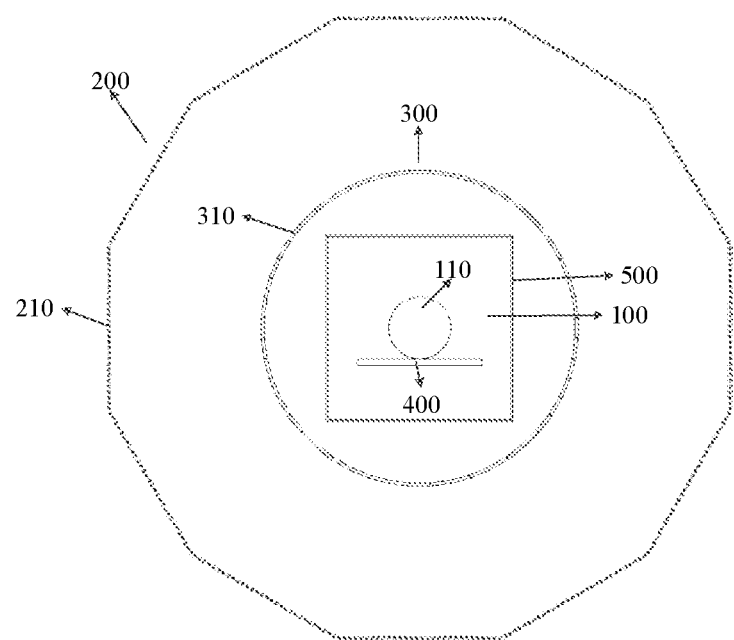
FIG. 1 is a schematic diagram of an imaging system according to some embodiments of the present disclosure.

Hereinafter, embodiments of the present disclosure are described with reference to the accompanying drawings. The following detailed description and accompanying drawings are used to exemplarily illustrate the principle of the present disclosure. The present disclosure is not limited to the described preferred embodiments, and the scope of the present disclosure is defined by the claims. The present disclosure is described in detail with reference to exemplary embodiments, some of which are illustrated in the accompanying drawings. The following description is made with reference to the accompanying drawings, and unless otherwise indicated, the same reference numerals in different accompanying drawings represent the same or similar elements. The solutions described in the following exemplary embodiments do not represent all the solutions of the present disclosure. On the contrary, these solutions are only examples of systems and methods of various aspects of the present disclosure related to the appended claims.

The imaging system and imaging method for radiographic inspection according to the embodiments of the present disclosure can be applied to medical, security inspection, industry and other fields for transmission imaging inspection of objects, human bodies, etc.

Figure 2:
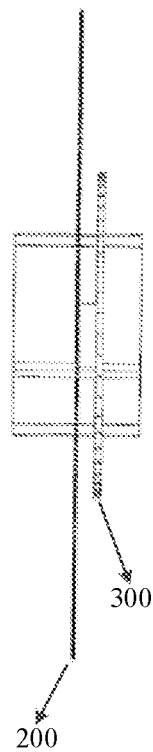
FIG. 2 is a sectional view of an imaging system according to some embodiments of the present disclosure.
Figure 3:
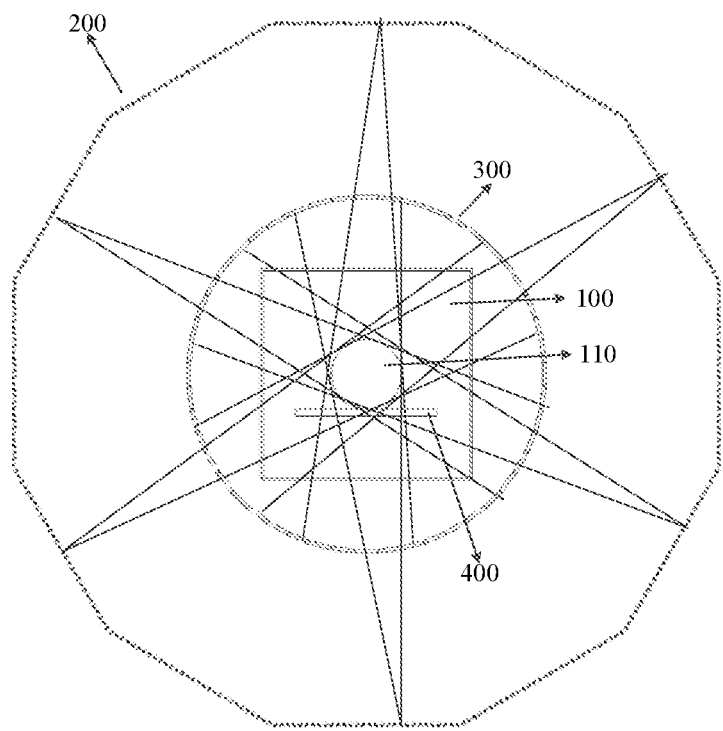
FIG. 3 is a schematic diagram of ray emission of an imaging system according to some embodiments of the present disclosure.

FIG. 1 is a schematic diagram of an imaging system according to some embodiments of the present disclosure. FIG. 2 is a sectional view of an imaging system according to some embodiments of the present disclosure. FIG. 3 is a schematic diagram of ray emission of an imaging system according to some embodiments of the present disclosure.

According to some embodiments of the present disclosure, as shown in FIG. 1, the imaging system for radiographic inspection includes an inspection area 100, a first ray source assembly 200, and a first detector assembly 300. The first ray source assembly 200 is used to emit X-rays. The first detector assembly 300 is used to receive X-rays emitted from the first ray source assembly 200 and transmitting through the inspection area 100 of the imaging system. According to some embodiments of the present disclosure, the first ray source assembly 200 and the first detector assembly 300 are arranged to surround the inspection area 100, that is, located radially outside of the inspection area 100. The imaging system is configured such that the first ray source assembly 200 and the first detector assembly 300 can move in a travelling direction relative to an object under inspection.

According to some embodiments of the present disclosure, the imaging system defines the inspection area 100. In this text, "inspection area" refers to the area that the object under inspection can enter. When the object under inspection is located in the inspection area 100, the X-rays emitted from the first ray source assembly 200 can penetrate the object under inspection and be received by the first detector assembly 300. In an exemplary embodiment, the inspection area 100 includes a first end and a second end. In some embodiments, the object under inspection is transferred into the inspection area 100 from one of the first end and the second end, and leaves the inspection area 100 from the other one.

According to some embodiments of the present disclosure, the object under inspection includes a region of interest (ROI), which is a local region of the object under inspection. For example, when the object under inspection is a human body, the region of interest can be a local region such as the heart and lungs of the human body. According to some embodiments of the present disclosure, the inspection area 100 includes an imaging area 110 with a central axis, that is, the imaging area 110 is a local area of the inspection area 100. In this text, the "imaging area" refers to the area where the region of interest of the object under inspection can enter and is subjected to X-ray transmission inspection. The size of the imaging area 110 is set to be large enough to accommodate the region of interest of the object under inspection. In this text, the central axis of the imaging area represents the axis passing through the approximate center of a cross section of the imaging area which is perpendicular to the travelling direction (hereinafter described). In some embodiments, the inspection area and imaging area are stationary relative to the first detector assembly 300 (and the second detector assembly 600 as described below). In some embodiments, the inspection area and imaging area are stationary relative to the first ray source assembly 200 and the first detector assembly 300 (and the second ray source assembly 700 and the second detector assembly 600 as described below).

In an exemplary embodiment, as shown in FIG. 1, the imaging system further includes a carrying device 400 for carrying the object under inspection. According to some embodiments of the present disclosure, the first ray source assembly 200 and the first detector assembly 300 can move in the travelling direction relative to the carrying device 400. Thus, the region of interest of the object under inspection can enter the imaging area 110 of the inspection area 100. In an exemplary embodiment, the carrying device 400 is used to transfer the object under inspection in the travelling direction to enter the inspection area 100. In an exemplary embodiment, the travelling direction is parallel to a horizontal direction. According to some embodiments of the present disclosure, the carrying device 400 can transfer the object under inspection back and forth in the travelling direction through the inspection area 100, that is, transfer the object under inspection back and forth in opposite directions. In some embodiments, the carrying device 400 transfers the object under inspection in a uniform linear movement. In an exemplary embodiment, the travelling direction is substantially parallel to the central axis of the imaging area 110. In some embodiments, the carrying device 400 is a conveyor belt or a loading platform.

According to some embodiments of the present disclosure, as shown in FIG. 1, the imaging system may further include a shielding member 500. In an exemplary embodiment, the shielding member 500 may be arranged to surround the inspection area 100 of the imaging system. In an exemplary embodiment, the first ray source assembly 200 and the first detector assembly 300 are arranged to surround the inspection area 100 and are located on the outside of the shielding member 500, that is, on a side of the shielding member 500 away from the inspection area 100.

In this text, "an axial direction" refers to a direction parallel to the travelling direction, "a radial direction" refers to a direction radiating outward from the central axis in a plane perpendicular to the travelling direction, and "a circumferential direction" refers to a direction perpendicular to the "radial direction" in a plane perpendicular to the travelling direction.

The structures and arrangements of the first ray source assembly and the first detector assembly according to some embodiments of the present disclosure are described in detail below with reference to the accompanying drawings.

According to some embodiments of the present disclosure, the first ray source assembly 200 includes a plurality of distributed ray sources 210, and each distributed ray source 210 includes a plurality of first targets. In some embodiments, each distributed ray source 210 includes a separate housing to define a separate vacuum space, and includes a plurality of first targets enclosed in the housing. In some embodiments, the plurality of first targets of each distributed ray source 210 have uniform target spacing. In some embodiments, the plurality of first targets of each distributed ray source 210 are distributed along a straight line.

As described above, when the first ray source assembly 200 includes a plurality of distributed ray sources 210, each distributed ray source 210 defines a separate vacuum space, and therefore does not share the vacuum space with other distributed ray sources 210. The vacuum spaces of different distributed ray sources 210 are not connected. According to some embodiments of the present disclosure, each distributed ray source 210 may be disassembled from and/or installed into the imaging system independently from other distributed ray sources 210.

As described above, the plurality of first targets in the distributed ray source 210 have uniform target spacing. However, the present disclosure is not limited to this. In some embodiments, the plurality of first targets in the distributed ray source 210 can be arranged non-uniformly, that is, can have non-uniform target spacing.

As described above, the plurality of first targets in each distributed ray source 210 are arranged along a straight line. However, the present disclosure is not limited to this. In some embodiments, the plurality of first targets in the distributed ray source 210 can be arranged along an arc, a polyline, or the like.

According to some embodiments of the present disclosure, all the first targets of the plurality of distributed ray sources 210 of the first ray source assembly 200 are arranged in the same plane (hereinafter referred to as "a first ray source plane"), that is, the plurality of distributed ray sources 210 of the first ray source assembly 200 are arranged in a coplanar manner. In this text, "the targets are arranged in the same plane" means that the ray emitting points of the targets are located in the same plane. In some embodiments, the first ray source plane is substantially perpendicular to the travelling direction (or the central axis).

In an exemplary embodiment, the plurality of distributed ray sources 210 of the first ray source assembly 200 extend completely around the imaging area 110, that is, the angle by which the plurality of distributed ray sources 210 of the first ray source assembly 200 continuously extend around the imaging area 110, substantially reaches 360° when viewed in the travelling direction. Thus, the plurality of distributed ray sources 210 of the first ray source assembly 200 form a complete and continuous first ray source ring. In some embodiments, the first ray source ring can be a circular ring, a square ring, a rectangular ring, a polygonal ring, and the like. For example, as shown in FIG. 1, the plurality of first distributed ray sources 210 of the first ray source assembly 200 form a polygonal ring.

As described above, the plurality of distributed ray sources 210 of the first ray source assembly 200 form a complete ray source ring. However, the present disclosure is not limited to this. In some embodiments, the ray source ring formed by the plurality of distributed ray sources 210 of the first ray source assembly 200 can be incomplete, that is, includes a gap. In some embodiments, the plurality of distributed ray sources 210 of the first ray source assembly 200 are divided into multiple segments, and the distributed ray sources 210 of different segments can be spaced apart from each other around the imaging area 110. In an exemplary embodiment, the plurality of distributed ray sources 210 of the first ray source assembly 200 have a combined extension angle greater than 180 degrees around the imaging area 110 relative to the central axis, when viewed in the travelling direction. In this text, the extension angle of each distributed ray source 210 around the imaging area 110 relative to the central axis represents the angle range of all the first targets of the corresponding distributed ray source 210 relative to the imaging area 110 (relative to the central axis of the imaging area 110). When the first ray source assembly 200 includes a plurality of distributed ray sources 210, the plurality of distributed ray sources 210 at different scanning positions relative to the imaging area 110 can provide a combined extension angle. In this text, the "combined extension angle" refers to the angle range generated by combining the respective extension angles of the plurality of distributed ray sources 210 at different scanning positions relative to the imaging area 110. In some embodiments, the combined extension angle of the plurality of distributed ray sources 210 at different scanning positions relative to the imaging area 110 may be continuous or discontinuous.

As described above, the plurality of distributed ray sources 210 of the first ray source assembly 200 form a ray source ring. However, the present disclosure is not limited to this. In some embodiments, the plurality of distributed ray sources 210 of the first ray source assembly 200 can extend continuously and only partially around the imaging area 110, that is, the plurality of distributed ray sources 210 of the first ray source assembly 200 provide a continuous combined extension angle around the imaging area 110 relative to the central axis, and the combined extension angle is smaller than 360°. In some embodiments, the plurality of distributed ray sources 210 of the first ray source assembly 200 have a continuous combined extension angle of greater than 180° and smaller than 360° relative to the central axis around the imaging area 110.

The first detector assembly 300 is used to receive X-rays that emitted from the first ray source assembly 200 and transmit through the imaging area 110 of the imaging system.

According to some embodiments of the present disclosure, the first detector assembly 300 includes a plurality of detector units 310. In some embodiments, the arrangement of the detector units in the first detector assembly 300 can be set according to the arrangement of the distributed ray sources 210 in the first ray source assembly 200 and/or the size of the object under inspection and other factors. In some embodiments, the arrangement of the detector units in the first detector assembly 300 can further be cost-effective, that is, meet the imaging requirements with as few detector units as possible.

According to some embodiments of the present disclosure, each first detector unit 310 of the first detector assembly 300 includes a plurality of first detector crystals. In an exemplary embodiment, each detector unit 310 is arranged not to block the X-rays emitted by the distributed ray source 210 on the same side, and be able to receive the X-rays emitted by the distributed ray sources 210 on other sides.

In an exemplary embodiment, the plurality of first detector units 310 are arranged in the same plane (hereinafter referred to as "a detector plane"). In this text, "detector units are arranged in the same plane" means that center planes of the detector units (such as center planes of the detector crystals) are all arranged in the same plane. For example, the center planes of the plurality of first detector units 310 are arranged in the same plane by the same positioning reference. In some embodiments, the detector plane is substantially perpendicular to the travelling direction (the central axis). In some embodiments, the first detector unit 310 includes a single row of detector crystals or multiple rows of detector crystals.

In some embodiments, as shown in FIG. 2, along the central axis (or the travelling direction), the first ray source plane of the first ray source assembly 200 is spaced apart from the detector plane of the first detector assembly 300 with a predetermined distance. In an exemplary embodiment, the first ray source plane of the first ray source assembly 200 is substantially parallel to the detector plane of the first detector assembly 300.

In an exemplary embodiment, the plurality of first detector units 310 of the first detector assembly 300 extend completely around the imaging area. Thus, the plurality of first detector units 310 form a complete and continuous first detector ring. In some embodiments, the first detector ring may be a circular ring, a square ring, a rectangular ring, a polygonal ring, or the like. For example, as shown in FIG. 1, the plurality of first detector units 310 form a circular ring.

As described above, the plurality of first detector units 310 form a complete detector ring. However, the present disclosure is not limited to this. In some embodiments, the detector ring formed by the plurality of first detector units 310 may be incomplete, that is, may include a gap. In some embodiments, the plurality of first detector units 310 are divided into multiple segments, and the first detector units 310 of different segments can be spaced apart from each other around the imaging area.

Each first target of the first ray source assembly 200 has a ray emission range. According to some embodiments of the present disclosure, the ray emission ranges of at least some of the first targets of the first ray source assembly 200 are selected to be able to cover the imaging area 110. In this text, the ray emission range of the target covering the imaging area 110 means that the ray emission range of this target can just cover the imaging area 110 or is slightly larger than the imaging area 110. The ray emission ranges of these first targets of the first ray source assembly 200 may cover the inspection area 100 or may not cover the inspection area 100. In some embodiments, the ray emission range of each of these first targets of the first ray source assembly 200 is selected such that it is insufficient to cover the inspection area 100, that is, the ray emission range of each of these first targets is smaller than the inspection area 100. In an exemplary embodiment, the ray emission range of each first target of the first ray source assembly 200 can cover the imaging area 110, and optionally, the ray emission range of each first target is insufficient to cover the inspection area 100. Compared with the existing ray source whose ray emission range covers the entire object under inspection, the first ray source assembly according to the embodiments of the present disclosure can provide a smaller ray emission range to merely cover the imaging area, so that transmission imaging can be performed only on the imaging area and the region of interest of the object under inspection.

According to some embodiments of the present disclosure, the imaging area 110 is defined between the first ray source plane of the first ray source assembly 200 and an outer edge of the first detector assembly 300 away from the first ray source assembly 200. In an exemplary embodiment, the imaging area 110 is defined as a cylindrical area. In this case, the central axis of the imaging area 110 is the rotation axis of the cylindrical area. In some embodiments, the imaging area 110 is defined to be sufficient to accommodate the region of interest of the object under inspection. In an exemplary embodiment, the imaging system is configured such that each point in the imaging area 110 can be penetrated by the X-rays from the first ray source assembly 200 and that the X-rays after penetrating the corresponding point can be detected by the first detector assembly 300.

Figure 4:
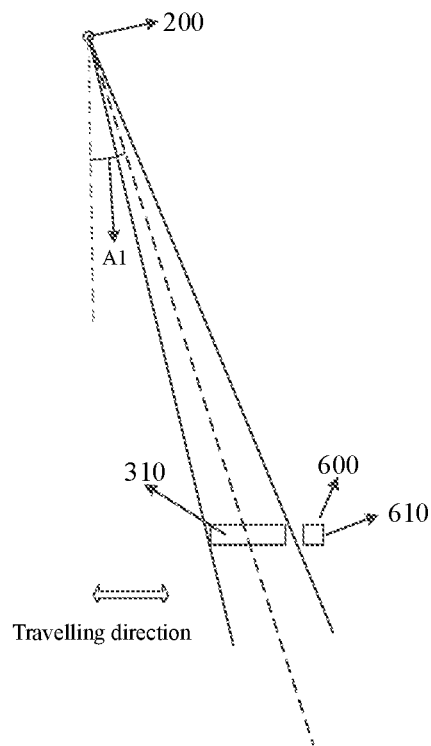
FIG. 4 is a partial sectional view of an imaging system according to some embodiments of the present disclosure.

The relative positions of the first ray source assembly and the first detector assembly according to some embodiments of the present disclosure are described in detail below with reference to the accompanying drawings. FIG. 4 is a partial sectional view of an imaging system according to some embodiments of the present disclosure.

According to some embodiments of the present disclosure, as shown in FIG. 4, each first target of the first ray source assembly 200 is arranged to deflect a first deflection angle A1 towards the first detector unit 310 of the first detector assembly 300 in the travelling direction. In some embodiments, the first deflection angle is between 1° and 5°. In some embodiments, each distributed ray source 210 deflects around the axis of its first targets. In some embodiments, the first ray source assembly 200 may further include a collimator for deflecting the direction of the X-rays emitted by the distributed ray source 210 of the first ray source assembly 200 towards the first detector assembly 300 in the travelling direction with the first deflection angle.

In some embodiments, the first deflection angle is set such that the X-rays emitted by each distributed ray source 210 of the first ray source assembly 200 will not be blocked by the first detector assembly 300 before passing through the imaging area. In some embodiments, when the ray emission direction of the first ray source assembly 200 is deflected relative to the first detector assembly 300, the ray emission direction is not perpendicular to the central axis of the imaging area.

By deflecting the ray emission direction of the first ray source assembly 200 relative to the first detector assembly 300, the X-rays emitted by the distributed ray source 210 of the first ray source assembly 200 can avoid the detector units 310 of the first detector assembly 300 on the same side, and also can be received by the detector units 310 of the first detector assembly 200 on other sides.

In some embodiments, the first detector assembly 300 is arranged to be located at the radial inner side of the first ray source assembly 200 when viewed along the travelling direction (or the central axis). In other words, the first detector assembly 300 is arranged closer to the central axis of the imaging area 110 than the first ray source assembly 200.

In some embodiments, when viewed along the central axis (or the travelling direction), the carrying device 400 is arranged to be located at the radial inner side of the first detector assembly 300, and the first detector assembly 300 is arranged to be located at the radial inner side of the first ray source assembly 200. Thus, as shown in FIG. 1, the first ray source assembly 200, the first detector assembly 300 and the carrying device 400 are arranged in order from outside to inside.

According to some embodiments of the present disclosure, the imaging system may further have a position adjustment function to adjust a position of the region of interest of the object under inspection relative to the imaging area 110. For example, when the region of interest of the object under inspection is not completely located in the imaging area 110, by means of the position adjustment function, the region of interest of the object under inspection can be moved to be completely located in the imaging area 110.

In some embodiments, the carrying device 400 is configured to be able to adjust the position of the region of interest of the object under inspection relative to the imaging area 110. In some embodiments, the first ray source assembly 200 is configured to be able to rotate within a predetermined range relative to the imaging area 110 (or the carrying device 400) when viewed in the travelling direction, so as to adjust the position of the region of interest of the object under inspection relative to the imaging area 110. Thus, the region of interest of the object under inspection can be located within the imaging area 110 by the adjustment.

The ray emission control according to some embodiments of the present disclosure is described in detail below with reference to the accompanying drawings.

According to some embodiments of the present disclosure, the imaging system may further include a ray source control device (not shown). In some embodiments, the ray source control device can be configured to control the ray emission of the first ray source assembly 200, such as emission sequence, emission frequency, emission current, and the like of the targets.

According to some embodiments of the present disclosure, the ray source control device is configured such that when the region of interest of the object under inspection is at least partially located in the imaging area 110, the plurality of distributed ray sources 210 of the first ray source assembly 200 emit X-rays simultaneously from at least two first targets to the imaging area 110 at the same time. Therefore, more than two first targets in the first ray source plane of the first ray source assembly 200 simultaneously emit X-rays. Therefore, the imaging system according to the embodiments of the present disclosure can improve the ray emission frequency, especially without increasing the occupied volume of the imaging system and the cost of additional detectors.

In some embodiments, the ray source control device is configured such that the first ray source assembly 200 emit X-rays simultaneously from at least two first targets to the imaging area 110 each time the first ray source assembly 200 is controlled to emit X-rays. In this case, each X-ray emission of the first ray source assembly 200 is simultaneous X-ray emission from multiple targets.

In some embodiments, among the at least two first targets of the first ray source assembly 200 that simultaneously emit X-rays to the imaging area 110, the ray emission range of each first target can cover the imaging area 110, and the detector crystals of the first detector assembly 300 corresponding to the ray emission ranges of any two first targets do not coincide with each other. By making the ray emission range of each first target of the first ray source assembly 200 cover the imaging area 110, the imaging system can perform transmission imaging only on the imaging area 110 and the region of interest of the object under inspection located therein, thereby reducing the occupied volume and cost of the imaging system. By making the detector crystals corresponding to the first targets simultaneously emitting X-rays do not coincide with each other, signal acquisition without mutual interference can be performed while multiple targets are simultaneously beamed out, which can help the subsequent image reconstruction and improve the transmission scanning efficiency. As shown in FIG. 3, the first ray source assembly 200 can emit X-rays simultaneously from six first targets at the same time.

The ray emission mode of the first ray source assembly 200 of the imaging system according to some embodiments of the present disclosure is described below.

In some embodiments, the first ray source assembly 200 includes a total of N first targets, and all the N first targets are divided into M groups, with M<N/2. Each group includes the same number of first targets. The first targets in each group come from different distributed ray sources 210 respectively. The first targets in each group do not coincide with each other (that is, each first target belongs to only one group). In each group, the detector crystals of the first detector assembly 300 corresponding to the ray emission ranges of the respective first targets do not coincide with each other. The ray source control device controls all the first targets in one group to simultaneously emit X-rays at the same time, and makes the M groups of first targets to emit X-rays in turn.

In some embodiments, the first ray source assembly 200 includes a total of N first targets, and all the N first targets are divided into M groups, with M<N/2. Each group includes the same or different number of first targets, and each group includes at least one first target (that is, the number of first targets in each group can be one). The first targets in each group come from different distributed ray sources 210 respectively. The first targets in each group do not coincide with each other (that is, each first target belongs to only one group). In each group, the detector crystals of the first detector assembly 300 corresponding to the ray emission ranges of the respective first targets do not coincide with each other. The ray source control device controls all the first targets in one group to simultaneously emit X-rays at the same time, and makes the M groups of first targets to emit X-rays in turn.

In some embodiments, the first ray source assembly 200 includes a total of N first targets, and all the N first targets are divided into M groups, with M<N/2. Each group includes the same number of first targets. The first targets in each group come from different distributed ray sources 210 respectively. The first targets in each group can be partially coincident (that is, one first target can belong to two or more groups at the same time). In each group, the detector crystals of the first detector assembly 300 corresponding to the ray emission ranges of the respective first targets do not coincide with each other. The ray source control device controls all the first targets in one group to simultaneously emit X-rays at the same time, and makes the M groups of first targets to emit X-rays in turn.

The three ray emission modes of the imaging system are exemplarity described above. However, the present disclosure is not limited to this. According to the embodiments of the present disclosure, the imaging system may further have other ray emission modes. When there are more than two first targets in the first ray source plane of the first ray source assembly 200 that can simultaneously emit X-rays, the ray emission modes of the imaging system can be combined according to the number of groups of first targets in the first ray source assembly 200, the grouping attribution of each first target, the emission interval and order of each group of first targets and the like, to achieve different modes of X-ray emission.

According to some embodiments of the present disclosure, the imaging system can further be configured to reconstruct a three-dimensional scanning (CT) image of the region of interest of the object under inspection based on the detection data of the first detector assembly 300. According to some embodiments of the present disclosure, the imaging system can adopt iterative reconstruction algorithm, analytical reconstruction algorithm, or the like, or a combination of different reconstruction algorithms, when reconstructing the three-dimensional scanning image of the region of interest of the object under inspection.

When the ray emission range of the first target of the first ray source assembly 200 only covers the region of interest and the region of interest is completely located inside the object under inspection, the projection data may be truncated, and in this case, the imaging of the region of interest of the object under inspection belongs to an internal problem of CT. Compared with the image reconstruction when the entire object under inspection is covered by the ray emission range, there is a problem that the solution of the CT internal problem is not unique in theory.

To solve the above problem, in some implementation cases, except the first target (also called a small fan angle target) of which the ray emission range only covers the imaging area 110 while does not cover the entire inspection area 100, the first ray source assembly 200 can further include a second target (also called a large fan angle target), of which the ray emission range can cover the inspection area 100.

According to some embodiments of the present disclosure, the first ray source assembly 200 further includes at least one second target (large fan angle target). The ray emission range of the second target is selected to be able to cover the inspection area 100. In some embodiments, the first detector assembly 300 is further configured to receive X-rays emitted from the second target of the first ray source assembly 200 and transmitting through the inspection area 100. In an exemplary embodiment, when one distributed ray source 210 of the first ray source assembly 200 includes the second target, the distributed ray source 210 including both the first target and the second target can arrange each target in the same way as the distributed ray source 210 including only the first target.

In some embodiments, the ray source control device is configured such that the second target does not emit X-rays when the first target of the first ray source assembly 200 emits X-rays, and that the first target does not emit X-rays when the second target of the first ray source assembly 200 emits X-rays. Therefore, the large fan angle target and the small fan angle target of the imaging system emit X-rays separately.

In some embodiments, the first ray source assembly 200 includes a plurality of second targets. The ray source control device is configured such that the first ray source assembly 200 emits X-rays simultaneously from at least two second targets to the inspection area at the same time. In some embodiments, among the at least two second targets of the first ray source assembly 200 that simultaneously emit X-rays to the inspection area, the first detector crystals corresponding to the ray emission ranges of any two second targets do not coincide with each other. Therefore, the first ray source assembly 200 can include more than two second targets simultaneously emitting X-rays. In some embodiments, a plurality of second targets of the first ray source assembly 200 are uniformly distributed. For example, assuming that the first ray source assembly 200 includes a total of 9 targets, wherein the first, fourth, and seventh targets can be the second targets, and the remaining second, third, fifth, sixth, eighth, and ninth targets can be the first targets as described above.

The ray emission mode of the first ray source assembly 200 including the second target according to some embodiments of the present disclosure is described below. In some embodiments, the first ray source assembly 200 includes N1 first targets and N2 second targets. The ray source control device can divide N1 first targets into M groups (M<N1/2) by referring to any ray emission mode as described above, and control the M groups of first targets and the N2 second targets to emit X-rays in a predetermined sequence. The ray source control device is configured such that the second targets do not emit X-rays when the first targets of the first ray source assembly 200 emit X-rays, and that the first targets do not emit X-rays when the second targets of the first ray source assembly 200 emit X-rays. In each group of first targets, the detector crystals of the first detector assembly 300 corresponding to the ray emission ranges of the respective first targets do not coincide with each other. When the first ray source assembly 200 emits X-rays simultaneously from at least two second targets to the inspection area 100 at the same time, the first detector crystals corresponding to the ray emission ranges of the second targets that simultaneously emits X-rays do not coincide with each other.

By using the above configuration, the large fan angle targets can be used to image the entire object under inspection, which is helpful to avoid or solve the internal problem of CT; meanwhile, the small fan angle targets can be used to improve the imaging quality of the region of interest.

According to the above embodiments, the plurality of first targets of the first ray source assembly 200 can simultaneously emit X-rays, and optionally the plurality of second targets of the first ray source assembly 200 can also simultaneously emit X-rays. Since multiple targets emit X-rays simultaneously, the X-rays emitted by the respective targets and the scattered signals generated by the object under inspection will superimpose on each other and interact each other, which may reduce the signal-to-noise ratio of the first detector assembly and thus affect the imaging quality.

In order to correct the scattered signals, according to some embodiments of the present disclosure, the imaging system can further include a second detector assembly 600 for receiving the X-rays scattered from the object under inspection. According to some embodiments of the present disclosure, the second detector assembly 600 is arranged to surround the inspection area 100, that is, located at the radial outer side of the inspection area 100. In some embodiments, the second detector assembly 600 is stationary relative to the first detector assembly 300.

FIG. 4 shows an imaging system including a second detector assembly according to some embodiments of the present disclosure. In some embodiments, the second detector assembly 600 includes a plurality of second detector units 610. In an exemplary embodiment, the plurality of second detector units 610 of the second detector assembly 600 are arranged corresponding to the plurality of first detector units 310 of the first detector assembly 300, preferably by one-to-one correspondence. According to some embodiments of the present disclosure, the second detector units 610 are arranged not to receive main X-rays emitted from the first ray source assembly 200, but to receive the X-rays scattered by the object under inspection.

In an exemplary embodiment, each second detector unit 610 includes a plurality of second detector crystals. The second detector crystals 611 of each second detector unit 610 are arranged side by side with the first detector crystals 311 of the corresponding first detector unit 310. In this text, "arranged side by side" means that the corresponding first detector crystals and the second detector crystals are in roughly the same radial and circumferential positions when viewed in the travelling direction. Along the travelling direction (or the central axis), the corresponding second detector crystals 611 and the first detector crystals 311 are arranged to contact or be spaced apart from each other, which will be described in detail below with reference to the accompanying drawings.

In some embodiments, along the travelling direction (or the central axis), the second detector crystals of each second detector unit 610 are spaced apart from the first detector crystals of the corresponding first detector unit 310, so that the second detector unit 610 does not receive the main X-rays emitted from the first ray source assembly 200. Thus, the second detector units 610 of the second detector assembly 600 are arranged outside of the ray emission ranges of the first targets of the first ray source assembly 200.

Figure 5:
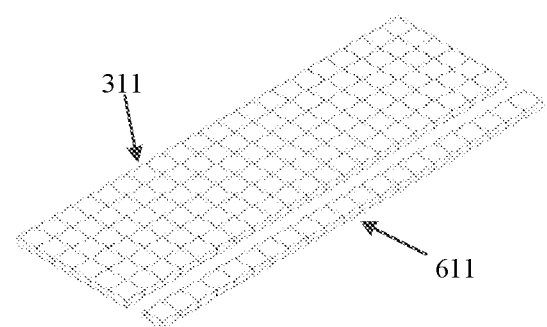
FIG. 5 is a schematic diagram of a first detector assembly and a second detector assembly according to some embodiments of the present disclosure.
Figure 6:
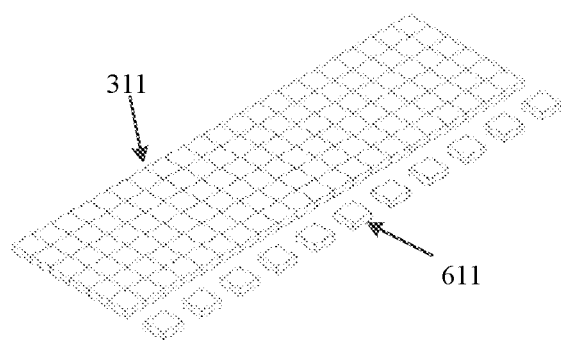
FIG. 6 is a schematic diagram of a first detector assembly and a second detector assembly according to some embodiments of the present disclosure.

FIG. 5 is a schematic diagram of a first detector assembly and a second detector assembly according to some embodiments of the present disclosure. FIG. 6 is a schematic diagram of a first detector assembly and a second detector assembly according to some embodiments of the present disclosure. As shown in FIGS. 5 and 6, the second detector crystals 611 of the second detector unit are spaced apart from the first detector crystals 311 of the corresponding first detector unit along the travelling direction (or the central axis).

In some embodiments, the second detector crystals of each second detector unit 610 and the first detector crystals of the corresponding first detector unit 310 are arranged to contact each other along the travelling direction (or the central axis). In an exemplary embodiment, the imaging system further includes a blocking member arranged such that the second detector unit 610 does not receive the main X-rays emitted from the first ray source assembly 200. Because the second detector crystals are arranged immediately adjacent to the first detector crystals, and thus may receive some of the main X-rays. By providing the blocking member, the second detector unit 610 can be prevented from receiving the main X-rays, so as to improve the detection accuracy of the second detector assembly and the detection accuracy of the transmission X-ray signals after correction.

Hereinafter, the blocking member according to some embodiments of the present disclosure will be described with reference to the accompanying drawings.

Figure 7:
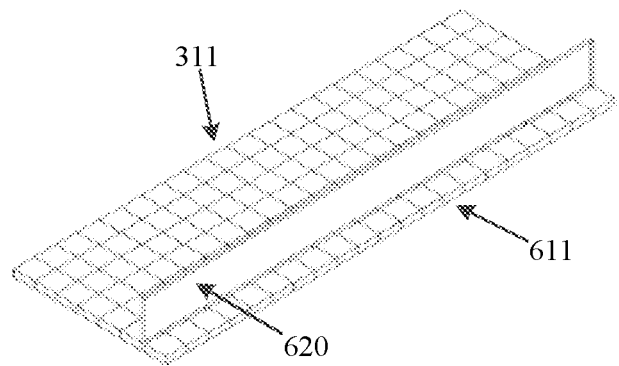
FIG. 7 is a schematic diagram of a first detector assembly and a second detector assembly according to some embodiments of the present disclosure.
Figure 8:
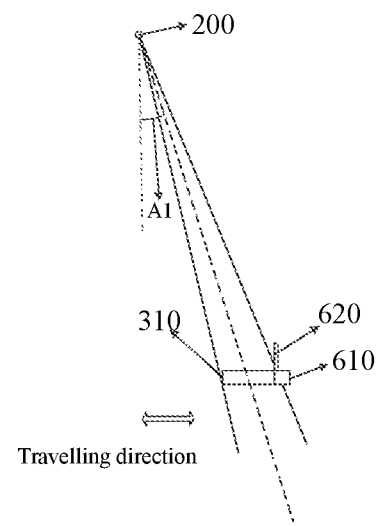
FIG. 8 is a partial sectional view of an imaging system including a second detector assembly and a blocking member according to some embodiments of the present disclosure.

FIG. 7 is a schematic diagram of a first detector assembly and a second detector assembly according to some embodiments of the present disclosure. FIG. 8 is a partial sectional view of an imaging system including a second detector assembly and a blocking member according to some embodiments of the present disclosure. As shown in FIGS. 7 and 8, the second detector crystals 611 of the second detector unit 610 and the first detector crystals 311 of the corresponding first detector unit 310 are arranged immediately adjacent each other in the travelling direction. Along the travelling direction (or the central axis), the blocking member 620 is arranged between the second detector crystals 611 of the second detector unit 610 and the first detector crystals 311 of the first detector unit 310 adjacent each other. In some embodiments, the blocking member 620 is arranged to directly contact the second detector unit 610 and/or the second detector unit 310, such as directly contact the radial inner surface (the upper surface shown in FIG. 8) of the second detector unit 610 and/or the second detector unit 310. In the embodiments shown in FIGS. 7 and 8, the blocking member 620 is a vertical blocking member, that is, it extends substantially in a vertical direction when viewed in the circumferential direction.

Figure 9:
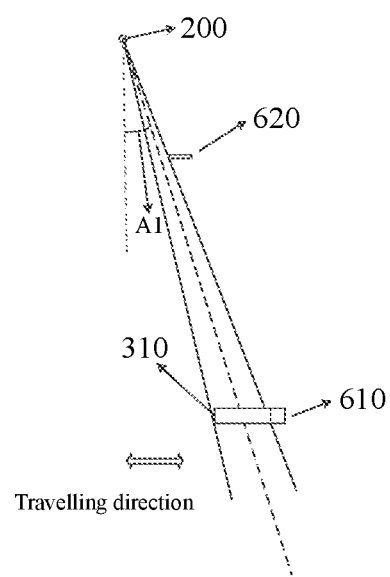
FIG. 9 is a partial sectional view of an imaging system including a second detector assembly and a blocking member according to some embodiments of the present disclosure.
Figure 10:
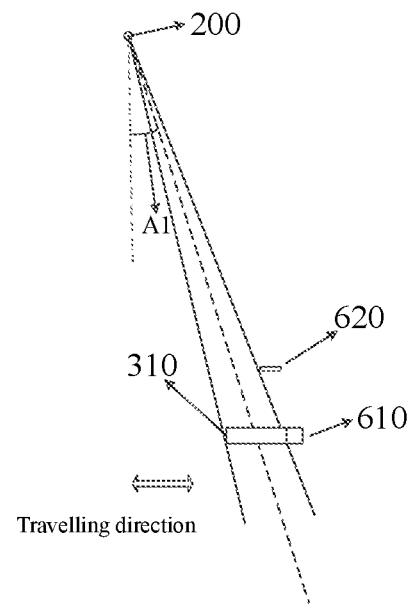
FIG. 10 is a partial sectional view of an imaging system including a second detector assembly and a blocking member according to some embodiments of the present disclosure.

FIG. 9 is a partial sectional view of an imaging system including a second detector assembly and a blocking member according to some embodiments of the present disclosure. FIG. 10 is a partial sectional view of an imaging system including a second detector assembly and a blocking member according to some embodiments of the present disclosure. As shown in FIGS. 9 and 10, the second detector crystals of the second detector unit 610 and the first detector crystals of the corresponding first detector unit 310 are arranged immediately adjacent each other in the travelling direction. The blocking member 620 is arranged to be spaced apart from, that is, not in direct contact with the second detector unit 610 and the first detector unit 310. As required, the blocking member 620 can be arranged farther away from the second detector unit 610 and the first detector unit 310 (as shown in FIG. 9), or closer to the second detector unit 610 and the first detector unit 310 (as shown in FIG. 10). In the embodiments shown in FIGS. 9 and 10, the blocking member 620 is a horizontal blocking member, that is, it extends substantially in the horizontal direction when viewed in the circumferential direction.

As described above, when the second detector crystals 611 of the second detector unit 610 and the first detector crystals 311 of the corresponding first detector unit 310 contact each other in the travelling direction, the blocking member is provided. However, the present disclosure is not limited to this. It should be understood that when the second detector crystals 611 of the second detector unit 610 and the first detector crystals 311 of the corresponding first detector unit 310 are arranged to be spaced apart from each other, the blocking member can also be provided.

Some embodiments of the blocking member are exemplarity described above. However, the present disclosure is not limited to this. It should be understood that as long as the blocking member can prevent the second detector unit 610 from receiving the main X-rays, the blocking member can be arranged in any structure and form.

In some embodiments, as shown in FIGS. 5 and 7, the number of second detector crystals 611 of each second detector unit is equal to the number of first detector crystals 311 of the corresponding first detector unit. Thus, for each column of first detector crystals 311 of the first detector unit 310, one column (at least one) of second detector crystals 611 for receiving the scattered signals are correspondingly provided.

The scatter correction mode according to some embodiments of the present disclosure is exemplarily described below. Assuming that the readings of the respective columns of first detector crystals 311 of the first detector unit 310 are p1, p2, p3 . . . respectively, and the readings of the respective columns of second detector crystals 611 in of the second detector unit 610 are q, and considering that the scattered signal is a low-frequency signal and the width of the detection crystal is small, the transmission X-ray signals after the scatter correction can be expressed as p1-q, p2-q, p3-q.

In some embodiments, as shown in FIG. 6, the number of second detector crystals 611 of each second detector unit is less than the number of first detector crystals 311 of the corresponding first detector unit. For example, the second detector crystals 611 of the second detector unit 610 are spaced apart from each other along a length direction of the first detector unit 310. For example, based on the readings of the respective columns of second detector crystals 611, the calculated values of the scattered signals of the respective columns of first detector crystals 311 at the place where the second detector crystal 611 is not provided, can be obtained by means of interpolation or fitting, and the scatter signal correction can be performed accordingly.

Figure 11:
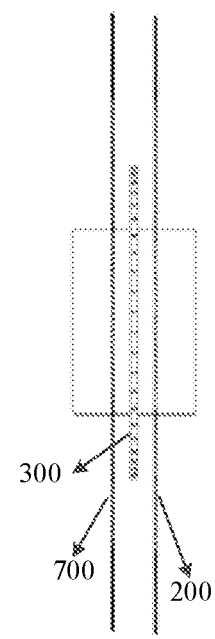
FIG. 11 is a sectional view of an imaging system including a second ray source assembly according to some embodiments of the present disclosure.

As described above, the imaging system includes the first ray source assembly 200 with the first targets arranged in the first ray source plane. However, the present disclosure is not limited to this. FIG. 11 is a sectional view of an imaging system including a second ray source assembly according to some embodiments of the present disclosure. In some embodiments, as shown in FIG. 11, the imaging system further includes a second ray source assembly 700 for emitting X-rays. When the imaging system includes the second ray source assembly 700, the first detector assembly 300 is further configured to receive X-rays emitted from the second ray source assembly 700 and transmitting through the inspection area 100, especially the imaging area 110 of the imaging system. According to some embodiments of the present disclosure, when the object under inspection is located in the inspection area 100, the X-rays emitted from the second ray source assembly 700 can penetrate the object under inspection and be received by the first detector assembly 300.

According to some embodiments of the present disclosure, the second ray source assembly 700 includes a plurality of distributed ray sources, and each distributed ray source includes a plurality of third targets. Each distributed ray source of the second ray source assembly 700 may have the same structure, configuration and arrangement as the distributed ray source 210 of the first ray source assembly 200 according to any of the above embodiments. The third target of the second ray source assembly 700 may have the same structure, configuration and arrangement as the first target of the first ray source assembly 200 according to any of the above embodiments.

Each third target of the second ray source assembly 700 has a ray emission range. According to some embodiments of the present disclosure, the ray emission ranges of at least some of the third targets of the second ray source assembly 700 are selected to be able to cover the imaging area 110. In some embodiments, the ray emission range of each of these third targets of the second ray source assembly 700 is selected to be insufficient to cover the inspection area 100, that is, the ray emission range of each of these third targets is smaller than the inspection area 100. In an exemplary embodiment, the ray emission range of each third target of the second ray source assembly 700 can cover the imaging area 110, and optionally, the ray emission range of each third target is insufficient to cover the inspection area 100.

According to some embodiments of the present disclosure, all the third targets of the plurality of distributed ray sources of the second ray source assembly 700 are arranged in the same plane (hereinafter referred to as "a second ray source plane"), that is, the plurality of distributed ray sources of the second ray source assembly 700 are arranged in the same plane. In some embodiments, the second ray source plane is substantially perpendicular to the travelling direction (or the central axis). In some embodiments, the second ray source plane of the second ray source assembly 700 is spaced apart from the detector plane of the first detector assembly 300 with a predetermined distance along the travelling direction (or the central axis).

According to some embodiments of the present disclosure, the first ray source plane of the first ray source assembly 200, the detector plane of the first detector assembly 300, and the second ray source plane of the second ray source assembly 700 are distributed in order along the travelling direction (or the central axis). In an exemplary embodiment, for example, as shown in FIG. 11, the first ray source assembly 200 and the second ray source assembly 700 are respectively arranged on two sides of the first detector assembly 300 along the travelling direction (or the central axis). Thus, the imaging system according to some embodiments of the present disclosure includes two ray source planes, which are respectively located on two sides of the detector plane.

In an exemplary embodiment, the first ray source plane, the detector plane and the second ray source plane are basically parallel to each other. In some embodiments, the first ray source plane, the detector plane, and the second ray source plane are substantially perpendicular to the travelling direction (or the central axis).

According to some embodiments of the present disclosure, when the imaging system further includes the second ray source assembly 700, the imaging area 110 is defined to be located between the first ray source plane of the first ray source assembly 200 and the second ray source plane of the second ray source assembly 700. In an exemplary embodiment, the imaging area 110 is defined as a cylindrical area. In some embodiments, the imaging area 110 is defined to be sufficient to accommodate the region of interest of the object under inspection.

According to some embodiments of the present disclosure, the first ray source assembly 200, the first detector assembly 300, and the second ray source assembly 700 can move together relative to the carrying device 400 in the travelling direction.

According to some embodiments of the present disclosure, each target of the second ray source assembly 700 is arranged to deflect a second deflection angle towards the first detector unit 310 of the first detector assembly 300 in the travelling direction. In some embodiments, the second deflection angle is between 1 degrees and 5 degrees. In some embodiments, each distributed ray source of the second ray source assembly 700 deflects around the axis of its targets. In some embodiments, the second ray source assembly 700 may further include a collimator for deflecting the direction of the X-rays emitted by the distributed ray sources of the second ray source assembly 700 towards the first detector assembly 300 in the travelling direction with the second deflection angle. In some embodiments, the second deflection angle is set such that the X-rays emitted by each distributed ray source of the second ray source assembly 700 will not be blocked by the first detector assembly 300 before passing through the imaging area.

It should be understood that since the first ray source assembly 200 and the second ray source assembly 700 are respectively arranged on two sides of the first detector assembly 300, the X-rays emitted by the first ray source assembly 200 and the X-rays emitted by the second ray source assembly 700 deflect opposite each other. In an exemplary embodiment, the first deflection angle is equal to the second deflection angle.

According to some embodiments of the present disclosure, when the imaging system further includes the second ray source assembly 700, the ray source control device is further configured to control the ray emission of the second ray source assembly 700.

In some embodiments, the ray source control device is configured such that when the region of interest of the object under inspection is at least partially located in the imaging area 110, the plurality of distributed ray sources of the second ray source assembly 700 emit X-rays simultaneously from at least two third targets to the imaging area 110 at the same time. Among the at least two third targets of the second ray source assembly 700 simultaneously emitting X-rays to the imaging area 110, the ray emission range of each third target can cover the imaging area 110, and the detector crystals of the first detector assembly 300 corresponding to the ray emission ranges of any two third targets do not coincide with each other. Therefore, more than two targets in the second ray source plane emit X-rays simultaneously. According to some embodiments of the present disclosure, the ray source control device can be configured to control the ray emission of the second ray source assembly 700, such as emission sequence, emission frequency, emission current, and the like of the targets.

According to some embodiments of the present disclosure, the ray source control device is configured such that at least one first target of the first ray source assembly 200 and at least one third target of the second ray source assembly 700 simultaneously emit X-rays to the imaging area 110 at the same time when the region of interest of the object under inspection is at least partially located in the imaging area 110. In this case, the first ray source assembly 200 and the second ray source assembly 700 of the imaging system can emit X-rays from at least two targets (at least one first target and at least one third target). Therefore, the imaging system can further improve the ray emission frequency and scanning efficiency.

In some embodiments, when at least one first target of the first ray source assembly 200 and at least one third target of the second ray source assembly 700 simultaneously emit X-rays to the imaging area 110, the detector crystal of the first detector assembly 300 corresponding to the ray emission range of the first target of the first ray source assembly 200 and the detector crystal of the first detector assembly 300 corresponding to the ray emission range of the third target of the second ray source assembly 700 do not coincide with each other.

Some exemplary structures, configurations, and arrangements of the second ray source assembly 700 are described above. However, the present disclosure is not limited to this. It should be understood that any embodiment described herein involving the first ray source assembly 200 can be equally applied to the second ray source assembly 700.

An imaging method according to some embodiments of the present disclosure is described in detail below. According to some embodiments of the present disclosure, the imaging method can be implemented using any of the above described imaging systems.

Taking the imaging system including the first ray source assembly 200 and the first detector assembly 300 as an example, an imaging method according to some embodiments of the present disclosure is described below. However, it should be understood that the imaging system for implementing the imaging method according to the embodiments of the present disclosure can further include a second ray source assembly 700.

In step S10, the object under inspection is loaded on the carrying device 400 of the imaging system.

In step S20, the first ray source assembly 200 and the first detector assembly 300 are made to move in the travelling direction relative to the carrying device 400, so that the region of interest of the object under inspection can enter the imaging area 110, and at the same time the first ray source assembly 200 is made to emit X-rays and the X-rays are made to pass through the imaging area 110 and are received by the first detector assembly 300. In some embodiments, the object under inspection is transferred in the travelling direction through the carrying device 400.

In the process of the first ray source assembly 200 emitting X-rays, the plurality of distributed ray sources 210 of the first ray source assembly 200 are made to simultaneously emit X-rays from at least two first targets to the imaging area 110 at the same time. Among the at least two targets of the first ray source assembly 200 that simultaneously emit X-rays to the imaging area 110, the ray emission range of each target can cover the imaging area 110, and the detector crystals of the first detector assembly 300 corresponding to the ray emission ranges of any two targets do not coincide with each other.

According to some embodiments of the present disclosure, the imaging method can further adjust the position of the region of interest of the object under inspection relative to the imaging area 110 through the position adjustment function of the imaging system. For example, when the region of interest of the object under inspection is not completely located in the imaging area 110, the region of interest of the object under inspection can be moved to be completely located in the imaging area 110 by means of the position adjustment function of the imaging system.

In some embodiments, the imaging method further includes adjusting the position of the region of interest of the object under inspection relative to the imaging area 110 by the carrying device 400 after the object under inspection is loaded on the carrying device 400 in step S10. In some embodiments, the imaging method further includes after the object under inspection is loaded on the carrying device 400 in step S10, rotating the first ray source assembly 200 relative to the imaging area 110 (or the carrying device 400) within a predetermined range when viewed in the travelling direction, so as to adjust the position of the region of interest of the object under inspection relative to the imaging area 110. Thus, the imaging method can make the region of interest of the object under inspection be located within the imaging area 110 through adjustment.

According to some embodiments of the present disclosure, the imaging method can further provide a second target (a large fan angle target) whose ray emission range can cover the inspection area 100 to solve potential CT internal problems. It should be understood that any embodiment herein involving a second target can be applied to the imaging method.

In some embodiments, in the step S20 described above, the step of the first ray source assembly 200 emitting X-rays further includes emitting X-rays from the second target of the first ray source assembly 200. The ray emission range of the second target is selected to be able to cover the inspection area 100. In some embodiments, when the first target of the first ray source assembly 200 emits X-rays, the second target does not emit X-rays, and when the second target of the first ray source assembly 200 emits X-rays, the first target does not emit X-rays.

According to some embodiments of the present disclosure, the imaging method can further include step S30: reconstructing a three-dimensional scanning (CT) image of the region of interest of the object under inspection based on the detection data of the first detector assembly 300. In some embodiments, the imaging method can further include recognizing the object under inspection and providing the recognition result after reconstructing the three-dimensional scanning image of the object under inspection. In some embodiments, the imaging method may further include displaying the three-dimensional scanning image and/or recognition results.

In some embodiments, the imaging method can further use the second detector assembly 600 according to the above embodiments of the present disclosure to correct the scattered signals. It should be understood that any embodiments herein involving the second detector assembly can be applied to the imaging method. In the above step S30, the imaging method reconstructs the three-dimensional scanning image of the region of interest of the object under inspection based on the detection data of the first detector assembly 300 and the second detector assembly 600. Thus, the signal-to-noise ratio of the first detector assembly can be improved and thus the imaging quality can be improved.

In some embodiments, before performing the step S10, the imaging method can further preload or produce configuration information or correction information, such as background data, air data, and the like.

In the imaging method according to some embodiments of the present disclosure, other embodiments of the used imaging system are described above and incorporated into the embodiments of the imaging method accordingly, and will not be repeated here.

Although the present disclosure has been described with reference to exemplary embodiments, it should be understood that the present disclosure is not limited to the construction and method of the above embodiments. On the contrary, the present disclosure is intended to cover various modifications and equivalent configurations. In addition, although various elements and method steps of the disclosure are shown in various exemplary combinations and configurations, other combinations including more and fewer elements or methods fall within the scope of the present disclosure.

What is claimed is:

1. An imaging system for radiographic inspection, comprising:
    an inspection area, wherein an object under inspection can enter the inspection area, the inspection area comprises an imaging area, wherein the imaging area is a local area of the inspection area, a region of interest of the object under inspection can enter the imaging area, the region of interest is a local region of the object under inspection, and the imaging area is configured to be sufficient to accommodate the region of interest of the object under inspection;

a first ray source assembly for emitting X-rays, wherein the first ray source assembly comprises a plurality of distributed ray sources, each distributed ray source comprises a plurality of first targets, and all the first targets of the first ray source assembly are arranged in a first ray source plane;

a first detector assembly for receiving X-rays emitted from the first ray source assembly and transmitting through the imaging area of the imaging system, wherein the first detector assembly comprises a plurality of first detector units, each first detector unit comprises a plurality of first detector crystals, the plurality of first detector units are arranged in a detector plane, and the detector plane and the first ray source plane are spaced apart from each other in a travelling direction of the object under inspection with a predetermined distance; and a ray source control device, configured such that when the region of interest is at least partially located in the imaging area, the first ray source assembly emits X-rays simultaneously from at least two first targets to the imaging area at the same time, wherein among the at least two first targets of the first ray source assembly that simultaneously emit X-rays to the imaging area, a ray emission range of each first target is configured to cover merely the imaging area and be insufficient to cover the inspection area, and the first detector crystals corresponding to the ray emission ranges of any two first targets do not coincide with each other, and the first ray source assembly further comprises at least one second target, and a ray emission range of the at least one second target is configured to be larger than the ray emission range of each first target and be able to cover the entire inspection area.

2. The imaging system according to claim 1, further comprising a carrying device for carrying the object under inspection, wherein the imaging system is configured such that the first ray source assembly and the first detector assembly can move in the travelling direction relative to the carrying device, so that the region of interest of the object under inspection can enter the imaging area.

3. The imaging system according to claim 2, wherein the carrying device is further configured to be able to adjust a position of the region of interest of the object under inspection relative to the imaging area, so that the region of interest of the object under inspection is located within the imaging area, and/or when viewed in the travelling direction, the first ray source assembly is configured to be able to rotate within a predetermined range relative to the carrying device to adjust a position of the region of interest of the object under inspection relative to the imaging area, so that the region of interest of the object under inspection is located within the imaging area.

4. The imaging system according to claim 2, wherein when viewed in the travelling direction, the first detector assembly is arranged at a radial inner side of the first ray source assembly.

5. The imaging system according to claim 4, further comprising a second detector assembly for receiving X-rays scattered from the object under inspection, wherein the second detector assembly comprises a plurality of second detector units, and each second detector unit comprises a plurality of second detector crystals, wherein the plurality of second detector units of the second detector assembly are arranged correspondingly to the plurality of first detector units of the first detector assembly.

6. The imaging system according to claim 5, wherein the imaging system further comprises a blocking member arranged such that the second detector units do not receive main X-rays emitted from the first ray source assembly, or the second detector crystals of each second detector unit are spaced apart from the first detector crystals of the corresponding first detector unit in the travelling direction, so that the second detector unit does not receive main X-rays emitted from the first ray source assembly.

7. The imaging system according to claim 5, wherein the number of second detector crystals of each second detector unit is equal to the number of first detector crystals of the corresponding first detector unit; or, the number of second detector crystals of each second detector unit is less than the number of first detector crystals of the corresponding first detector unit.

8. The imaging system according to claim 2, further comprising:

a second ray source assembly for emitting X-rays, wherein the second ray source assembly comprises a plurality of distributed ray sources, each distributed ray source comprises a plurality of third targets, all the third targets of the second ray source assembly are arranged in a second ray source plane, and the detector plane and the second ray source plane are spaced apart from each other in the travelling direction with a predetermined distance, wherein the first detector assembly is further configured to receive the X-rays emitted from the second ray source assembly and transmitting through the imaging area of the imaging system, wherein the first ray source plane, the detector plane and the second ray source plane are distributed in order in the travelling direction, wherein the ray source control device is configured such that when the region of interest is at least partially located in the imaging area, the second ray source assembly emit X-rays simultaneously from at least two third targets to the imaging area at the same time, and among the at least two third targets of the second ray source assembly that simultaneously emit X-rays to the imaging area, a ray emission range of each third target can cover the imaging area, and the first detector crystals corresponding to the ray emission ranges of any two third targets do not coincide with each other.

9. The imaging system according to claim 8, wherein the imaging system is configured such that the first ray source assembly, the first detector assembly and the second ray source assembly can move in the travelling direction relative to the carrying device, so that the region of interest of the object under inspection can enter the imaging area.

10. The imaging system according to claim 8, wherein the imaging area is located between the first ray source plane and the second ray source plane.

11. The imaging system according to claim 8, wherein the detector plane, the first ray source plane and the second ray source plane are parallel to each other.

12. The imaging system according to claim 8, wherein the ray source control device is configured such that at least one first target of the first ray source assembly and at least one third target of the second ray source assembly simultaneously emit X-rays to the imaging area at the same time when the region of interest of the object under inspection is at least partially located in the imaging area, and wherein when at least one first target of the first ray source assembly and at least one third target of the second ray source assembly simultaneously emit X-rays to the imaging area, the detector crystals of the first detector assembly corresponding to the ray emission range of the first target of the first ray source assembly and the detector crystals of the first detector assembly corresponding to the ray emission range of the third target of the second ray source assembly do not coincide with each other.

13. An imaging method using the imaging system according to claim 2, the imaging method comprising:
   (a) loading the object under inspection on the carrying device of the imaging system; and
   (b) making the first ray source assembly and the first detector assembly of the imaging system move in the travelling direction relative to the carrying device, so that the region of interest of the object under inspection can enter the imaging area, and meanwhile make the first ray source assembly emit X-rays and make the X-rays transmit through the imaging area to be received by the first detector assembly,
   wherein the step of the first ray source assembly emitting X-rays comprises: making the first ray source assembly emit X-rays simultaneously from at least two first targets to the imaging area at the same time, and
   wherein among the at least two first targets of the first ray source assembly that simultaneously emit X-rays to the imaging area, the ray emission range of each first target is configured to cover merely the imaging area and be insufficient to cover the inspection area, and the first detector crystals corresponding to the ray emission ranges of any two first targets do not coincide with each other, and
   wherein the step of the first ray source assembly emitting X-rays further comprises: making the first ray source assembly emit X-rays from the at least one second target, and the ray emission range of the at least one second target is configured to be larger than the ray emission range of each first target and be able to cover the entire inspection area.

14. The imaging system according to claim 1, wherein the imaging area is located between the first ray source plane and an outer edge of the first detector assembly away from the first ray source assembly.

15. The imaging system according to claim 1, wherein the detector plane and the first ray source plane are parallel to each other.

16. The imaging system according to claim 1, wherein when viewed in the travelling direction, the plurality of distributed ray sources of the first ray source assembly are configured to have a combined extension angle greater than 180 degrees around the imaging area.

17. The imaging system according to claim 1, wherein each first target of the first ray source assembly is arranged to deflect a first deflection angle towards the first detector unit of the first detector assembly in the travelling direction.

18. The imaging system according to claim 1,
   wherein the ray source control device is further configured such that the second target does not emit X-rays when the first target of the first ray source assembly emits X-rays, and that the first target does not emit X-rays when the second target of the first ray source assembly emits X-rays.

19. The imaging system according to claim 18, wherein the first ray source assembly comprises a plurality of second targets, wherein the ray source control device is configured such that the first ray source assembly can emit X-rays simultaneously from at least two second targets to the inspection area at the same time,
   wherein among the at least two second targets of the first ray source assembly simultaneously emitting X-rays to the inspection area, the first detector crystals corresponding to the ray emission ranges of any two second targets do not coincide with each other.

20. The imaging system according to claim 1, wherein each of the plurality of distributed ray sources defines a separate vacuum space, and vacuum spaces of different distributed ray sources are not connected, and
   wherein the imaging system is configured to image the region of interest of the object under inspection within the imaging area by means of the X-rays emitted from the first targets and image the object under inspection within the inspection area by means of the X-rays emitted from the at least one second target, to reconstruct a three-dimensional scanning (CT) image of the region of interest of the object under inspection.

* * * * *